March 22, 1927.
A. G. PERKINS
PIPE JOINT
Filed Oct. 21 1926
1,621,950
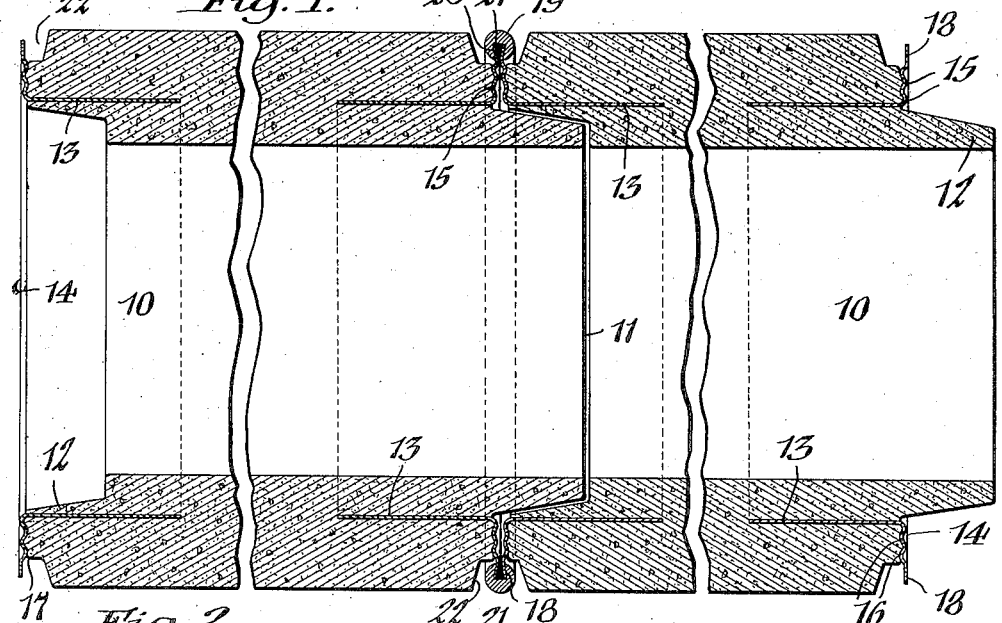
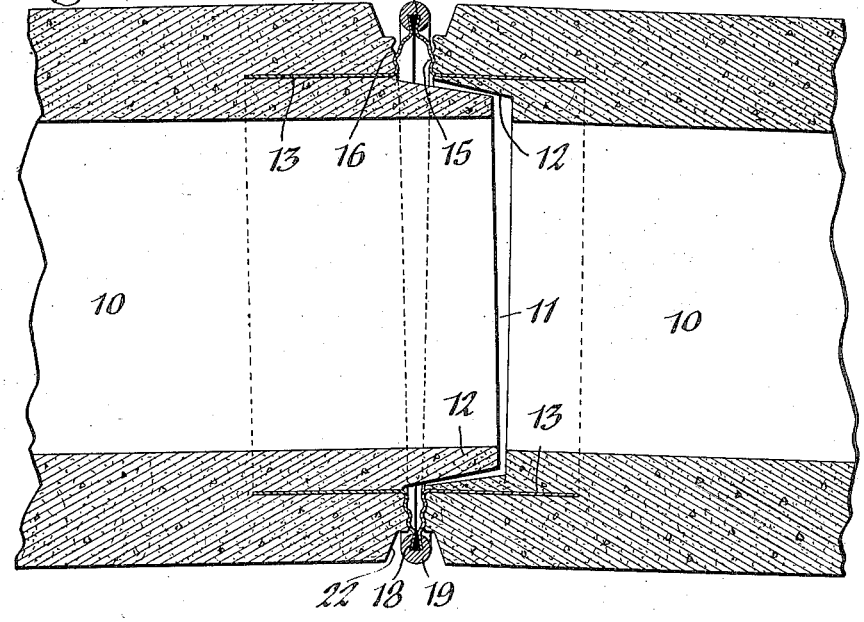
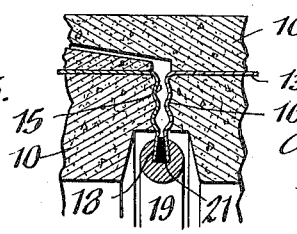
Inventor,
Albert G. Perkins,
by Geyer & Geyer
Attorneys.

Patented Mar. 22, 1927.

1,621,950

UNITED STATES PATENT OFFICE.

ALBERT G. PERKINS, OF BUFFALO, NEW YORK.

PIPE JOINT.

Application filed October 21, 1926. Serial No. 143,253.

This invention relates to improvements in pipe joints but more particularly to a flexible joint intended for use in connection with concrete piping and conduits.

It has for its object the provision of a simple, durable and reliable leak-proof joint of this character, which, while having the necessary qualities to compensate for expansion and contraction of the pipe-sections, permits them to readily flex at the joints and become misalined or assume a more or less angular position relative to each other in order to adapt themselves to irregularities of the ground which may be present when the pipes are laid or which may result afterwards by the settling or raising of the ground due to vibrations or other causes.

Another object of the invention is to provide a metallic water proof joint for concrete pipes which is so constructed that it may be contracted or elongated in response to the relative displacement of adjoining pipe-sections without liability of disturbing or breaking the joint.

In the accompanying drawings:—Figure 1 is a fragmentary central longitudinal section of two concrete pipes showing my improved joint applied thereto. Figure 2 is a similar view thereof showing the pipe-sections out of line by reason of the outer ends thereof having settled. Figure 3 is a modified form of the invention.

Similar characters of reference indicate corresponding parts throughout the several views.

The invention is shown, by way of example, in connection with a pair of adjoining concrete pipe-sections 10, 10 whose opposing ends meet in a scarf or rabbet joint 11, the ends of the respective sections terminating in interlocking annular flanges 12, 12 for this purpose. Sufficient clearance is left between the adjoining ends of the pipe-sections to permit them to expand and contract and to assume a more or less angular position relative to each other.

At their ends, the pipe sections are provided with metallic bands or coupling rings of substantially L-shape in cross-section and made of copper or other malleable material, each ring including a base or attaching portion 13 molded or otherwise embedded in the end of the respective pipe-section, and an outwardly-facing annular flange 14 which is disposed transversely to the axis of the pipe-sections and in the plane of its joint edges. As shown in Fig. 1, these flanges project radially outward a suitable distance beyond and clear of the exterior surface of the pipe-structure and are provided with a series of annular or concentric crimps or corrugations 15 which permit such flanges to flex more or less in the direction of their length and radially of the joint and thus compensate for any relative movement of the pipe-sections, such as misalinement thereof or lateral displacement of one section relative to an adjoining one. These corrugations extend outwardly from the junction of their flanges 14 with the companion bases 13 of the coupling rings and overlap the contiguous joint faces of the pipe-sections 10, such joint faces being shaped, as shown at 16, to conform to the overlying corrugations 15 and their corners 17 being rounded to prevent the action of the ring-flanges from chipping them off. The corrugations 15 terminate short of the outer edges of the ring-flanges and preferably at or near the exterior surface of the pipe-structure to provide marginal attaching portions 18. When the mating ends of two pipe-sections are brought together, their flanged coupling rings are disposed side by side for suitably fastening them about their entire circumference to produce a flexible water-tight joint capable of withstanding high pressures.

The means shown in the drawings for fastening the marginal portions 18 of adjoining coupling rings consists of a split or sectional ring 19 of copper or similar material. This ring is adapted to embrace the marginal attaching portions of the ring-flanges 14 and has a circumferential groove 20 therein for receiving such flange-portions. A packing 21 of lead or like material may be placed between the opposing ring-flanges to effectually seal the joint. In assembling the joint, the ring 19 is firmly secured to the attaching flanges by rolling or pinching its sides by hydraulic pressure or otherwise against the sides of the flanges, which together with the packing 21, are compressed and crowded into the ring-groove 20, producing a practically integrally united structure and forming a fluid-tight joint. As shown in Fig. 1, the inner edges of the fastening ring are pinched about the coupling ring flanges, which results in a dovetailed interlocking of these parts and causes the soft lead packing to be crowded firmly to the bottom of the ring-groove. It will be noted that the fastening ring 19 is free from contact with the exterior surface of the pipe-structure to permit the corrugated ring-flanges 14 to flex freely in response to relative movements of the pipe-sections, and if desired, the latter may be provided with an external groove 22 for receiving the opposing attaching portions of the coupling rings and the fastening ring, whereby these parts are substantially flush with the surface of the pipe-sections.

In Fig. 2 is shown the action of the improved joint when the outer ends of the pipe-sections have dropped, due for example, to settling of the ground. In such a case, the pipe-sections are misalined, the joint faces being separated at the top and adjoining sides and the corrugations of the flanges 14 having been distended or elongated to compensate for such relative movements of the pipe-sections. While freely permitting such action, the flanges are not strained to the point of separating the joint and the fastening ring 19 is not disturbed.

In the modification of the invention shown in Fig. 3, the joint is shown applied internally of the pipe-sections. In this case, the sections are of a size to permit workmen to enter them to assemble the joint and an internal joint of this type is particularly useful in tunnel and well work and also for laying pipe-sections on quicksand where it is practically impossible to make an external joint.

This improved joint, which is primarily intended for use with high pressure water lines, is manifestly simple, strong and water tight; it permits of assembling the pipe sections in a minimum period of tme and affords a material saving in water pipe installations. Furthermore, the corrugated construction of the coupling-ring flanges provides a flexible joint permitting a maximum relative movement of the pipe-sections due to their becoming misalined or laterally displaced by reason of the sagging or settling of the sections in the ground, without in any way disturbing or breaking the joint.

When the pipe-sections become misalined, as shown in Fig. 2, the separated or distended portions of the ring-flanges overlying the opposing ends of such sections are held more or less in contact with said ends by the water pressure in the pipe line.

I claim as my invention:—

1. In a flexible joint for concrete pipes, the combination of a pair of concrete pipe-sections, each provided at its ends with coupling rings of malleable metal, each ring comprising a base portion embedded in the concrete pipe-section and an annular flange projecting therefrom beyond the adjoining end of the pipe-section, and means for fastening the opposing marginal portions of said coupling ring flanges to form a fluid-tight joint, said fastening means and the marginal portions of the ring-flanges engaged thereby being clear of and unimbedded in the pipe-structure, said flanges being provided between their fastening means and their base portions with annular corrugations for permitting the flanges to flex freely in response to relative movements of the pipe-sections.

2. In a flexible joint for concrete-pipes, the combination of a pair of concrete pipe-sections, each provided at its ends with coupling rings, each ring comprising a base portion embedded in the pipe-section and a flange projecting therefrom having a series of concentric corrugations extending substantially from the base portion to a point short of the ends of the flange to provide a marginal attaching portion, and fastening means applied to the opposing marginal portions of said coupling ring flanges to form a fluid-tight joint, said corrugated flanges being free to flex radially in response to relative movements of the pipe-sections.

ALBERT G. PERKINS.